UNITED STATES PATENT OFFICE.

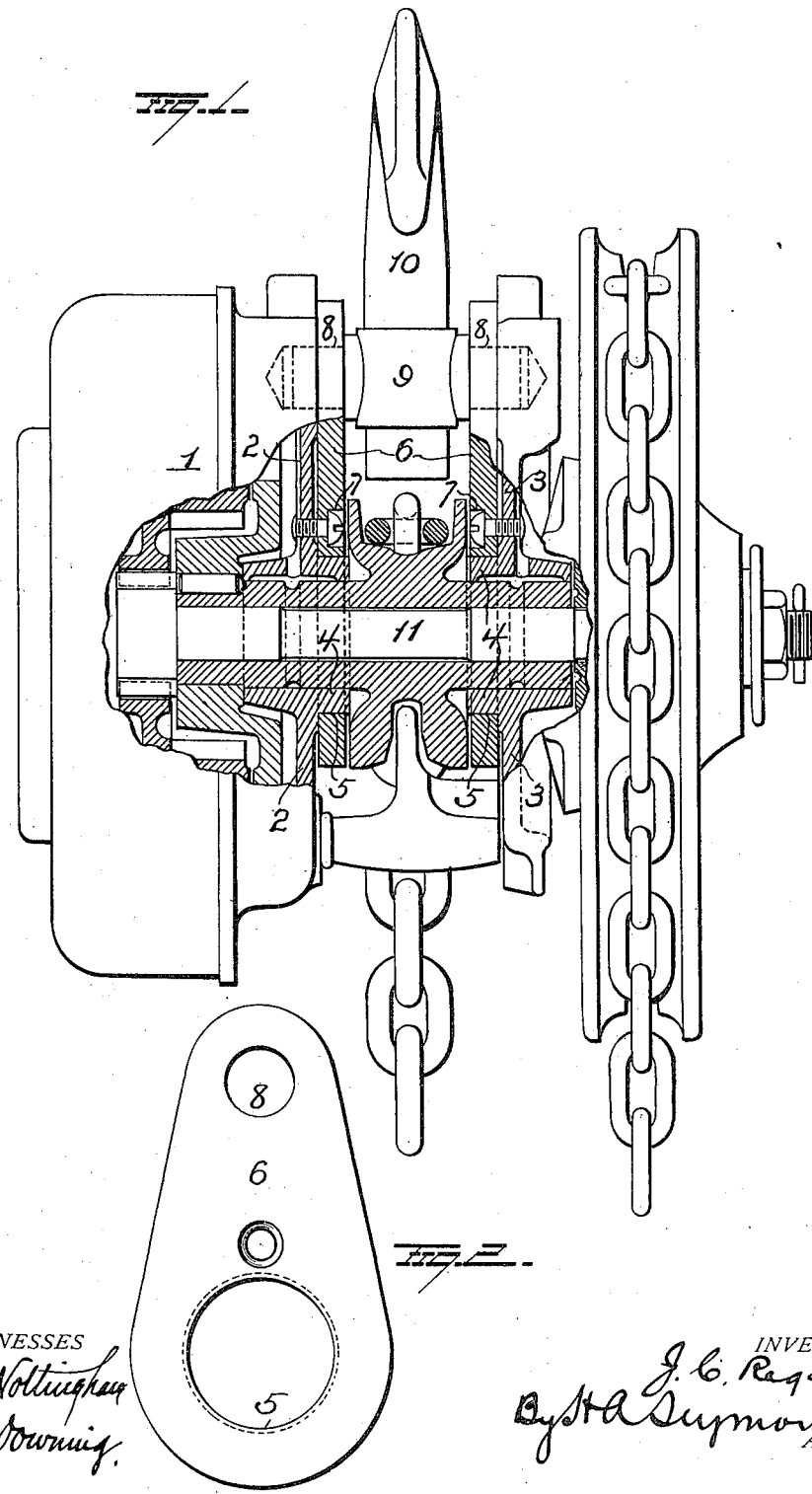

JOSEPH CHARLES REGAN, OF STAMFORD, CONNECTICUT, ASSIGNOR TO THE YALE & TOWNE MANUFACTURING COMPANY, OF STAMFORD, CONNECTICUT.

HOIST-BLOCK.

1,092,860.      Specification of Letters Patent.      Patented Apr. 14, 1914.

Application filed October 12, 1912. Serial No. 725,452.

*To all whom it may concern:*

Be it known that I, JOSEPH CHARLES REGAN, a citizen of the United States, residing at Stamford, in the county of Fairfield and State of Connecticut, have invented certain new and useful Improvements in Hoist-Blocks; and I do hereby declare the following to be a full, clear, and exact description of the invention, such as will enable others skilled in the art to which it appertains to make and use the same.

My invention relates to an improvement in hoist blocks, and it consists in the details of construction as will be more fully explained and pointed out in the claims.

In the accompanying drawings, Figure 1 is a view in elevation partly in section of a hoist block embodying my invention, and Fig. 2 is a view in elevation of one of the supporting frames detached.

1 represents the internal gear casing or housing, 2 the side frame thereof and 3 the side frame on the ratchet and drive pulley side of the block.

The construction of the gearing forms no part of my invention, and hence is not herein shown in detail or specifically referred to.

The side frames 2 and 3 are parallel and are spaced apart and held in position by spacing sleeves or bolts, and also by the suspension hook and main lifting sheave. Each frame 2 and 3 is provided with a bearing 4 projecting at both sides, the inwardly projecting ends of said bearings making a close fit in the openings 5 of the steel suspension plates 6. These suspension plates are shaped as shown in Fig. 2, and each is provided with the opening 5 for the bearing 4 on its side frame, with a counterbored hole for the passage of a securing screw 7, and adjacent its upper end with a hole 8 to receive the ends of the yoke 9 of the suspension hook 10. These suspension plates 6 rest solidly against the adjacent faces of the side frames 2 and 3, and are secured thereto by the screws 7, and as these plates are carried by the yoke of the suspension hook and closely embrace and support the bearings 4 of the axle of the main hoist sheave it will be seen that they support and sustain the entire load, and take all strains off the side frames 2 and 3. The axle 11 of the main hoist sheave rests in the bearings 4, but as these bearings are sustained by the steel plates, they simply take the wear while the weight of the load is sustained by the suspension plates 6. The ends of the yoke 9 pass through the plates 6 into bearings in the side frames 2 and 3, but the construction of the parts is such that the weight of the block and its load falls on the steel plates, and is never borne by the side frames alone.

Having fully described my invention what I claim as new and desire to secure by Letters-Patent, is:—

1. In a chain block, the combination of side frames each having an elongated cylindrical bearing projection at both sides, an axle closely fitting said elongated bearings and directly supported by the latter, a main hoist sheave fixed to said axle, a suspension plate secured to the inner face of each side frame, the suspension plates being independent of each other and each provided with an opening of a size and shape to receive the inwardly projecting ends of the side frame bearings, whereby the latter will be directly supported by its suspension plate, and a suspension hook having pivotal connection with each suspension plate.

2. In a chain block, the combination of side frames each having an elongated cylindrical bearing projection at both sides, an axle closely fitting said elongated bearings and directly supported by the latter, a main hoist sheave fixed to said axle, a suspension plate secured to the inner face of each side frame, the said plates being independent of each other and each provided with an opening of a size and shape to receive the inwardly projecting end of its side frame bearing, whereby the latter will be directly supported by its suspension plate and a suspension hook the yoke of which passes through holes in both suspension plates and into openings in the side frames.

In testimony whereof, I have signed this specification in the presence of two subscribing witnesses.

JOSEPH CHARLES REGAN.

Witnesses:
  SCHUYLER MERRITT,
  E. M. CROZIER.

Copies of this patent may be obtained for five cents each, by addressing the "Commissioner of Patents, Washington, D. C."